(12) United States Patent
Huen et al.

(10) Patent No.: US 9,094,119 B2
(45) Date of Patent: Jul. 28, 2015

(54) COMMUNICATIONS NETWORK FOR RETRANSMISSION OF SIGNALS

(75) Inventors: Tat-Sing Huen, Danville, CA (US); Huei Meng Chang, Milpitas, CA (US)

(73) Assignees: Huei Meng Chang, Milpitas, CA (US); Tat-Sing Huen, Danville, CA (US)

(*) Notice: Subject to any disclaimer, the term of this patent is extended or adjusted under 35 U.S.C. 154(b) by 228 days.

(21) Appl. No.: 13/543,719

(22) Filed: Jul. 6, 2012

(65) Prior Publication Data
US 2013/0010675 A1  Jan. 10, 2013

Related U.S. Application Data

(60) Provisional application No. 61/505,003, filed on Jul. 6, 2011, provisional application No. 61/635,243, filed on Apr. 18, 2012.

(51) Int. Cl.
*H04L 12/761* (2013.01)
*H04B 10/29* (2013.01)
*H04L 25/26* (2006.01)
*H04B 10/112* (2013.01)

(52) U.S. Cl.
CPC .................... *H04B 10/1129* (2013.01)

(58) Field of Classification Search
None
See application file for complete search history.

(56) References Cited

U.S. PATENT DOCUMENTS

| | | | | |
|---|---|---|---|---|
| 4,399,531 | A  * | 8/1983 | Grande et al. | 370/216 |
| 7,825,793 | B1 * | 11/2010 | Spillman et al. | 340/539.1 |
| 2006/0176863 | A1 * | 8/2006 | Robinson et al. | 370/338 |
| 2008/0100822 | A1 * | 5/2008 | Munro | 356/4.01 |
| 2008/0186206 | A1 * | 8/2008 | Reumerman | 340/902 |
| 2009/0323867 | A1 * | 12/2009 | Rasmussen | 375/343 |

* cited by examiner

*Primary Examiner* — Omar Ghowrwal

(57) ABSTRACT

A communications network comprises: a plurality of nodes, wherein the nodes are interconnected via links; and a gateway node that transmits a signal to one or more of the nodes, wherein certain ones of the nodes receives a transmission of the signal and selected ones of the nodes repeats the transmission of the signal, and wherein a given node of the interconnected nodes receives multiple transmissions of the signal from two or more other nodes of the interconnected nodes.

19 Claims, 12 Drawing Sheets

COMMUNICATIONS NETWORK FOR RETRANSMISSION OF SIGNALS

CROSS REFERENCE

This application claims priority from a provisional patent application entitled "METHOD FOR PHY LAYER FREE SPACE OPTICAL GIGABIT ETHERNET IN A CO-LINEAR AND RECTILINEAR CLUSTOER OF NODES USING SIGNAL REINFORCEMENT AND COLLISION DETECTION" filed on Jul. 6, 2011 and having an Application No. 61/505,003 and from a provisional patent application entitled "METHOD FOR MULTIPLES OF GIGABIT COMMUNICATIONS USING A MESH NETWORK OF STREET LAMPS POSTS AND/OR STREET LEVEL POLE STRUCTURES WITH LOW LATENCY ACCESS" filed on Apr. 18, 2012 and having an Application No. 61/635,243. Said applications are incorporated herein by reference.

FIELD OF INVENTION

This invention relates to systems, methods, and apparatuses for a communications network, and, in particular, to systems, methods, and apparatuses for a mesh network having signal repeating and signal correlation.

BACKGROUND

A high-speed communications network typically includes network devices, such as routers and bridges, used for facilitating delivery of data packets from source devices to destination devices. Information pertaining to the transfer of packets through the network is usually embedded within each of the packets. Each packet traveling through the network, e.g., the internet and/or ethernet, can typically be handled independently from other packets in the packet stream or traffic. For example, each router may include routing, switching, and/or bridging engines to process incoming packets and determine where those incoming packets should be forwarded.

In recent years, Wi-Fi/WiMax technologies have been extensively developed for user devices to access a wired backbone network such as the internet. Typically, Wi-Fi routers have been connected to each other to form a mesh network of routers to repeat and carry data packets and other data traffic throughout the mesh network. Each router generally stores and forwards each data packet before transmitting or retransmitting the data packet to the rest of the mesh network. Thus, a data packet may travel multiple hops from one node to another node in the network. Due to each router having to store the entire data packet before retransmitting, the latency increases as the number of hops increases. Thereby, the connection performance of the mesh network is severely degraded. Wireless link quality is also prone to interference from the surrounding environment causing the link quality to be time varying and unstable.

FIG. 1 illustrates a graph of various data link speeds with the effect of latency delay in a mesh network using store and forward packet repeating. For a short internet protocol ("IP") packet, there are about 20,000 bits to a packet. TCP/IP starts out with a window of 10 packets that is transmitted before the transmission stops and waits for an acknowledgment packet to continue with the transmission. With lower data transmission speeds of 3 Mbps or less, latency of 10 msec has little effect on the effective throughput.

However, as transmission speed increases, packets can travel at a faster rate causing latency to be a predominate consideration. For a 50 Mbps link speed having 10 msec latency, there is about twenty store and forward hops, where the effective throughput calculates to about 16 Mbps (about 40 Mbps less than the maximum link speed). Thus, as the number of nodes within a mesh network cluster increases, the number of hops also increases causing the effective throughput to decrease dramatically due to the latency. Therefore, the effective throughput can be much lower than the maximum link speed.

For a Wi-Fi mesh network communicating at 54 Mbps (e.g., 802.11g speeds), the limit on the number of hops from nodes to other nodes should be limited to 40 hops to prevent latency issues. For a large number of hops for a mesh network (e.g., a city, a neighborhood, or an office/campus deployment which can be in the 1,000's of nodes), the effective throughput is too low to support most applications, such as web cameras and web browsing internet access. For instance for multi-gigabit access speeds (e.g., 2 Gbps), a 10 msec of latency would be equivalent to 500 hops with an effective throughput of 24 Mbps. In effect, the multi-gigabit link would be crippled by the enormous latency due to the traditional packet store and forward methods.

Therefore, there exists a need for methods, systems, and apparatuses for a communications network that has improved range, greater reliability, availability, and reduced latency.

SUMMARY OF INVENTION

An object of this invention is to provide systems, methods, and apparatuses for a communications network that reduces latency by having nodes repeat data signals to other interconnected nodes either with or without storing and forwarding data packets.

Another object of this invention is to provide systems, methods, and apparatuses for a communications network, where nodes can correlate multiple transmissions of a signal from other nodes to strengthen the signal and to reduce interference by the multiple transmissions of the signal.

Yet another object of this invention is to provide systems, methods, and apparatuses for a communications network that can support high bandwidth traffic for various applications, including for backhaul of cellular 4G networks, for Wi-Fi hotspots, for wireless access points, and for relaying digital television transmissions.

Furthermore, another object of this invention is to provide systems, methods, and apparatuses for a communications network that has transmission speeds in the multiples of gigabits and can support a large number of nodes.

Briefly, the invention discloses a communications network comprising: a plurality of nodes, wherein the nodes are interconnected via links; and a gateway node that transmits a signal to one or more of the nodes, wherein certain ones of the nodes receives a transmission of the signal and selected ones of the nodes repeats the transmission of the signal, and wherein a given node of the interconnected nodes receives multiple transmissions of the signal from two or more other nodes of the interconnected nodes.

An advantage of this invention is that systems, methods, and apparatuses for a communications network that reduces latency by having nodes repeat data signals to other interconnected nodes either with or without storing and forwarding data packets are provided.

Another advantage of this invention is that systems, methods, and apparatuses for a communications network are provided, where nodes can correlate multiple transmissions of a signal from other nodes to strengthen the signal and to reduce interference by the multiple transmissions of the signal.

Yet another advantage of this invention is that systems, methods, and apparatuses for a communications network are provided, where the communications network can support high bandwidth traffic for various applications, including for backhaul of cellular 4G networks, for Wi-Fi hotspots, for wireless access points, and for relaying digital television transmissions.

Furthermore, another advantage of this invention is that systems, methods, and apparatuses for a communications network are provided, where the communication network has transmission speeds in the multiples of gigabits and can support a large number of nodes.

DESCRIPTION OF THE DRAWINGS

The foregoing and other objects, aspects, and advantages of the invention will be better understood from the following detailed description of the preferred embodiments of the present invention when taken in conjunction with the accompanying drawings.

DETAILED DESCRIPTION OF THE PREFERRED EMBODIMENTS

Those of ordinary skilled in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the exemplary embodiments of the present invention as illustrated in the accompanying drawings. The same reference indicators (or numbers) may be used throughout the drawings and the following detailed description to refer to the same, similar, or related subject matter.

To aid in the understanding of the present invention, the term co-linear can refer to nodes of a network that are positioned along a linear signal path, where those nodes can transmit signals in a direction along the linear signal path. For ease of reference, nodes that are not co-linear to each other can be referred to as rectilinear. Furthermore, a node of the present invention can be coupled to a stationary object, for instance, street lamps, stoplights, telephone poles, power poles, buildings, trees, scaffolding, or other stationary objects. A node of the present invention may also be free-standing at a stationary location. Thus, the nodes can be fixed at designated geographical locations.

In alternative embodiments of the present invention, the node can be coupled to a non-stationary object (e.g., a projector, laptop, printer, cellular phone, or other mobile device) as along as the location of the non-stationary object can be communicated to the other nodes of the mesh network or is otherwise known by the other nodes of the network. For instance, the known geographical location of the non-stationary object can be relayed to other nodes via the network or via direct links to the other nodes.

Figure 1:
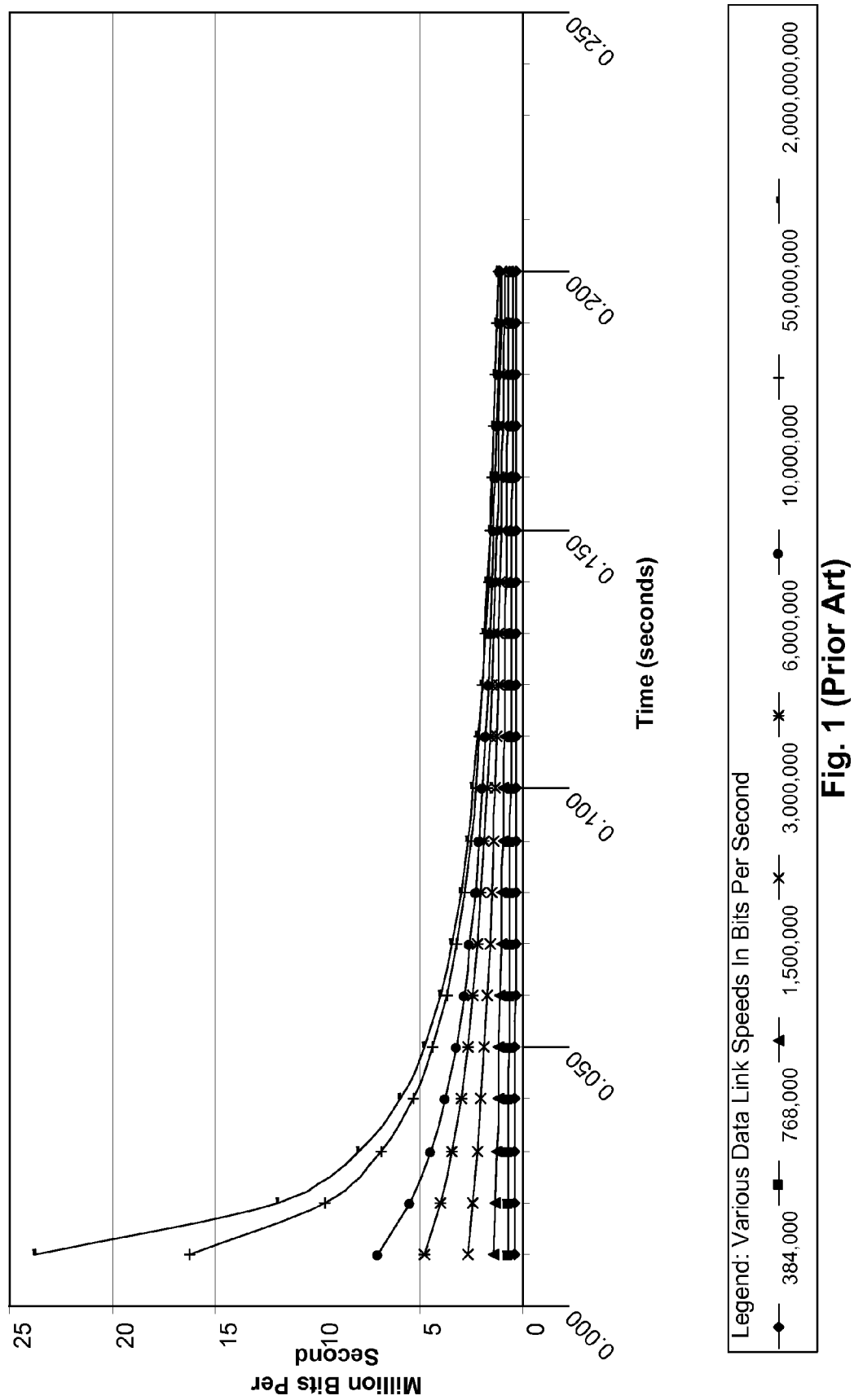
FIG. 1 illustrates a graph of various data link speeds with the effect of latency delay in a prior art mesh network using store and forward packet repeating.
Figure 2:
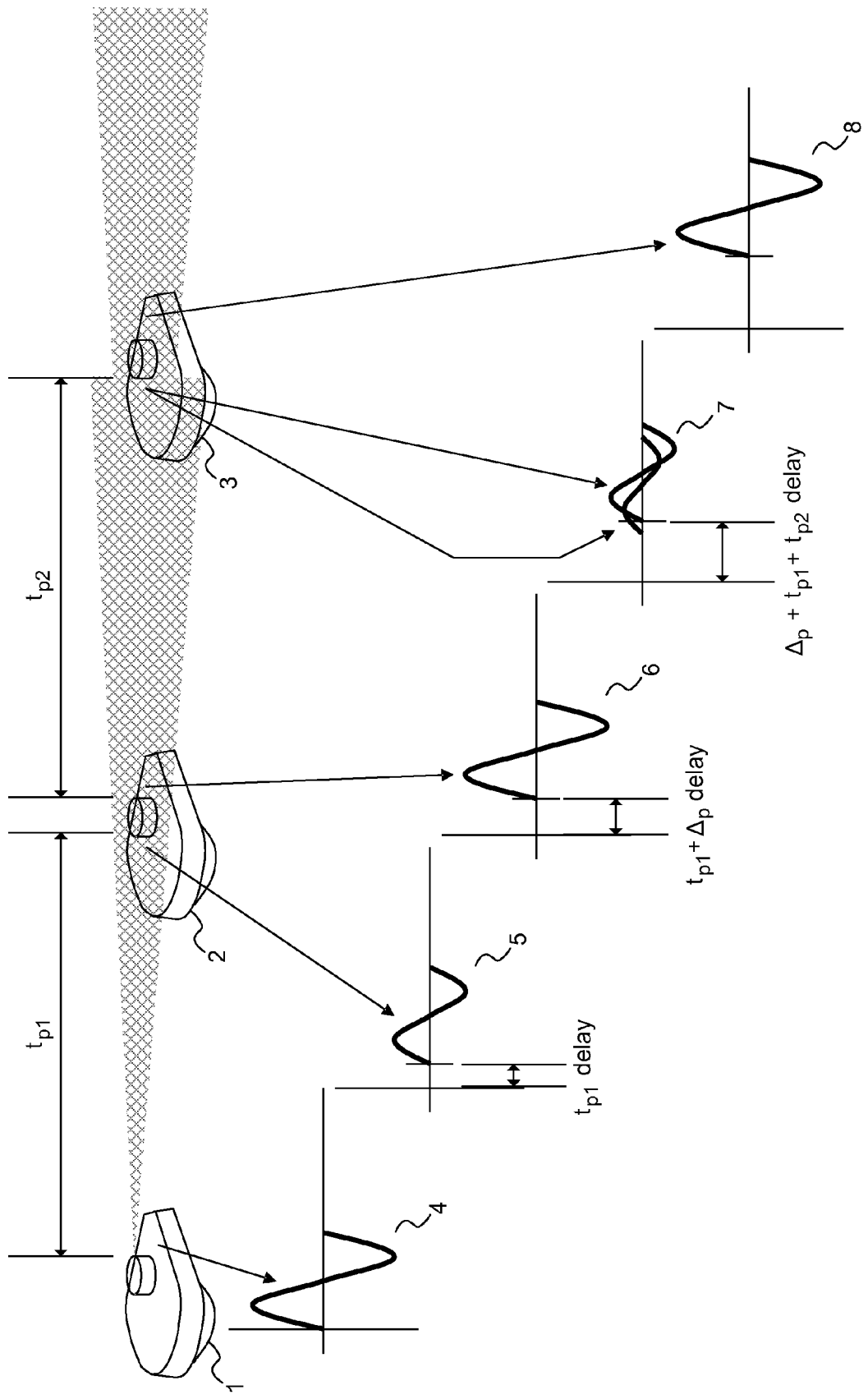
FIG. 2 illustrates nodes of the present invention positioned along a linear signal path.

FIG. 2 illustrates nodes of the present invention positioned along a linear signal path. Nodes 1, 2, and 3 are interconnected via wireless links. A signal is repeated from one node to another interconnected node until all the interconnected nodes of the network have received the signal. Here, node 1 transmits a signal to node 2. Node 2 then receives and repeats that signal by transmitting the signal to node 3. Since node 3 is positioned along the linear signal path of node 1's transmission, node 3 may receive the transmitted signal from node 1 as well as node 2.

Assuming node 3 receives node 1's transmission, the received signal at node 2 and the received signal at node 3 may slightly differ due to attenuation and the relative distances of nodes 2 and 3 from node 1. Node 3 will also receive a transmission of the signal from node 2 as well. Since node 3 has two transmissions of the signal (one transmission from node 1 and another transmission from node 2), node 3 can apply a correlation method to the received signals to obtain a strengthened, correlated signal and to reduce the interference by the multiple transmissions of the signal. If there are any other nodes interconnected to node 3 that have not received the signal, then node 3 transmits the correlated signal to those other interconnected nodes. Thus, correlation is performed on the signal as a function of the respective distances of the interconnected nodes, signal processing delay at each of the interconnected nodes, and the respective attenuation of the multiple transmissions. If those other interconnected nodes receive any of the other transmissions from node 1 and/or node 2, then those other interconnected nodes can also apply a correlation method to the multiple transmissions of the signal that is received.

Nodes 1, 2, and 3 can be deployed on street lamps, also referred to as luminaires, (or other stationary objects), as an example. Since many modern streets are positioned along straight lines, the poles on the same street are generally positioned along a linear signal path. To leverage this ideal placement, nodes 1, 2, and 3 can be coupled to street poles along a linear signal path. Thereby, nodes 1, 2, and 3 can be positioned collinearly and transmit signals to each other using a narrow electromagnetic ("EM") beam generated either by a directional RF antenna, a laser optical transmitter, or other directional EM transmitter. Thus, a self-backhauling capability is established that can be used for the network of luminaries, for ancillary functions of a smart grid network, for metro mobile internet access, as well as backhauling capacity for emerging cellular 4G networks, and for other applications.

Once node 2 receives signal 5, a symbol-time signal having one or more bits per symbol that is transmitted from node 1, received signal 5 can be down converted. Depending on how signal 4 was transmitted, received signal 5 can be down-converted to baseband from a radio frequency ("RF") signal or can be converted from an optical signal to an electrical baseband signal. Received signal 5 can have attenuation due to free space loss, atmospheric absorption, foliage or other factors, and has a propagation delay of $t_{p1}$. Symbol-time signal 5 is then filtered, signal processed, and amplified (shown in signal 6 with a time delay of $t_{p1}+\Delta_p$, where $\Delta_p$ is the signal processing delay of a node). Signal 6 is then up-converted to radio frequency (and/or converted from an electrical signal to an optical signal), and transmitted to other interconnected nodes (e.g., node 3).

Since nodes 1, 2, and 3 are co-linear, the received signal at node 3 (illustrated by signal 7) is a composite of signal 4 from node 1 (with additional signal attenuation and propagation delay of $t_{p1}+t_{p2}$) and signal 6 from node 2 (with signal attenuation and propagation and processing delay of $t_{p1}+t_{p2}+\Delta_p$). Signal 7 is processed with signal correlation at node 3 to obtain a correlated signal 8 using signal processing ("SP") techniques, similar to echo cancellation or other SP techniques. Ideally, correlation operates on an analog signal without conversion to a digital format since conversion to a digital format would increase the latency delay.

Figure 3:
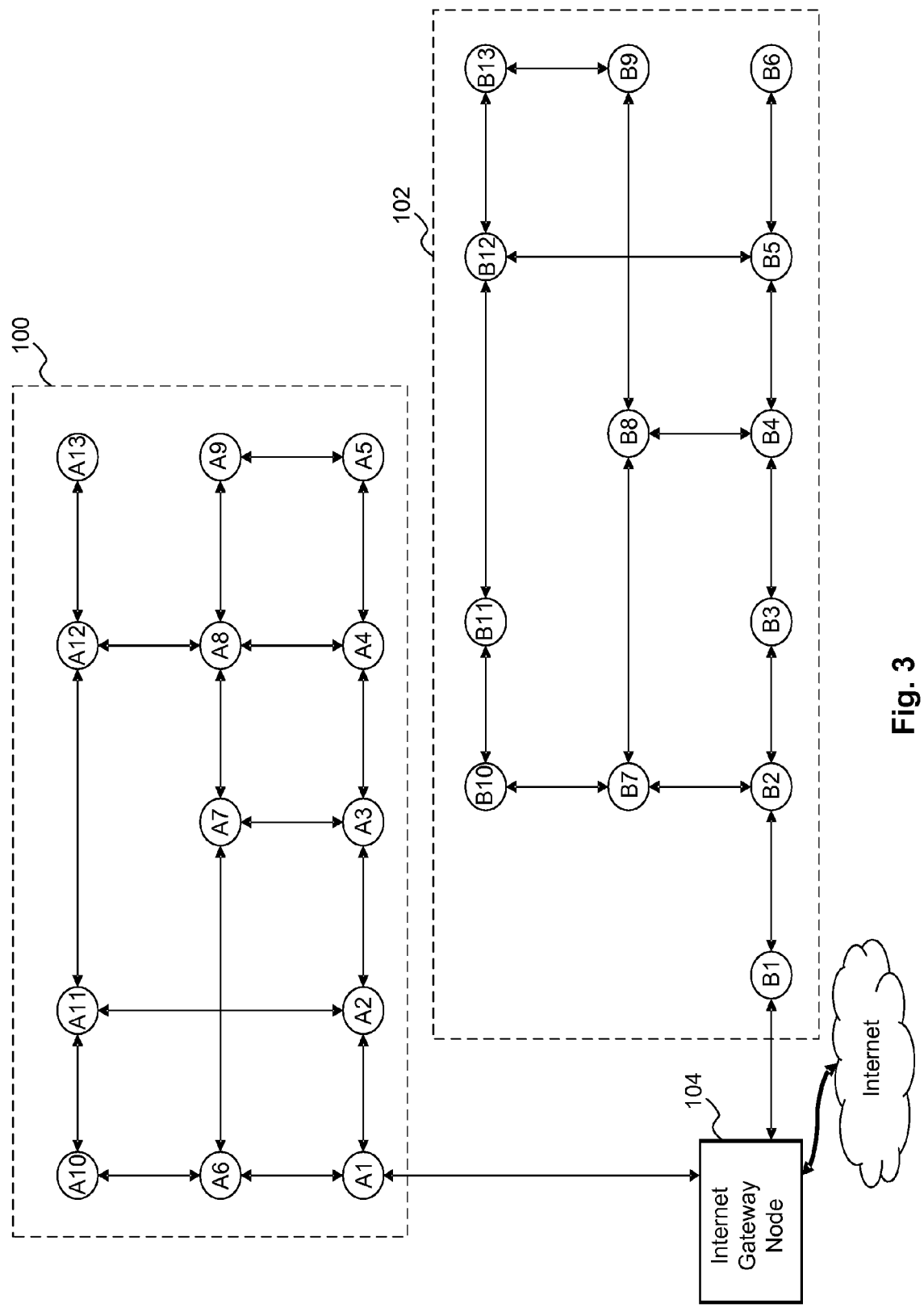
FIG. 3 illustrates a topology of a communications network of the present invention having co-linear nodes and rectilinear nodes.

FIG. 3 illustrates a topology of a communications network of the present invention having co-linear nodes and rectilinear nodes. The communications network comprises clusters 100 and 102 with thirteen nodes in each cluster and internet gateway node 104 to provide internet access to the nodes. Typical deployment can have as many as two thousand or more nodes within each cluster, where each node can be spaced apart a predefined distance, e.g., fifty meters to two hundred and fifty meters. Each of nodes A1-A13 and B1-B13 can be coupled to a street lamp, thereby fixing each node to a specific geographic location. There can also be other street lamps and other objects between any two nodes since poles are typically as close as twenty meters apart, depending on the lighting requirement of the city landscape.

Clusters 100 and 102 can have a total bandwidth of 1 Gbps or more ethernet traffic. The topology of the communication network is such that traffic originating from internet gateway node 104 travels to each of the nodes of clusters 100 and 102. Each node of clusters 100 and 102 repeats the analog signal originated by internet gateway node 104 to any interconnected nodes. Since the nodes do not store and forward any packets, the latency to deliver data is extremely small. The active links in clusters 100 and 102 can be determined by a predefined method, for instance a spanning tree method or an alternative method, such that the mesh topology forms a tree structure without loops. Cluster 100 and 102 can have a leaf-trunk convention, where a trunk direction is towards internet gateway node 104 and a leaf direction is towards a node.

A major criterion of the mesh network is that each node of clusters 100 and 102 is able to receive data traffic from internet gateway node 104. One or more of the nodes A1-A13 and B1-13 should also be co-linear so that some co-linear nodes can receive multiple transmissions of that repeated signal for correlation. Furthermore, nodes A1-A13 and B1-B13 can be connected to end user devices via Wi-Fi or via ethernet with a single or multiple physical wire connections, such that the end users can access the internet via the internet gateway node.

A point-to-multipoint directional beam can also be used to reinforce the signal that is transmitted from multiple co-linear and/or rectilinear nodes by repeating the same signal in a coherent manner. Each subsequent transmission of the signal from node to node can be correlated and strengthened to improve the overall range of the network and to reduce interference by the multiple transmissions of the signal.

The mesh network can thereby be scaled with as many or more than 2,000 nodes (which is a least 20 to 50 times the nodal size of conventional Wi-Fi mesh access point solution without the reduction of effective traffic payload speed associated with packet latency). This large network size scaling can be attributed to quick repeating of an up-converted RF signal and/or free space optical signal to baseband electrical signals and back to up-converted RF signal and/or free space optical signal without the use of packet store and forwarding.

Figure 4:
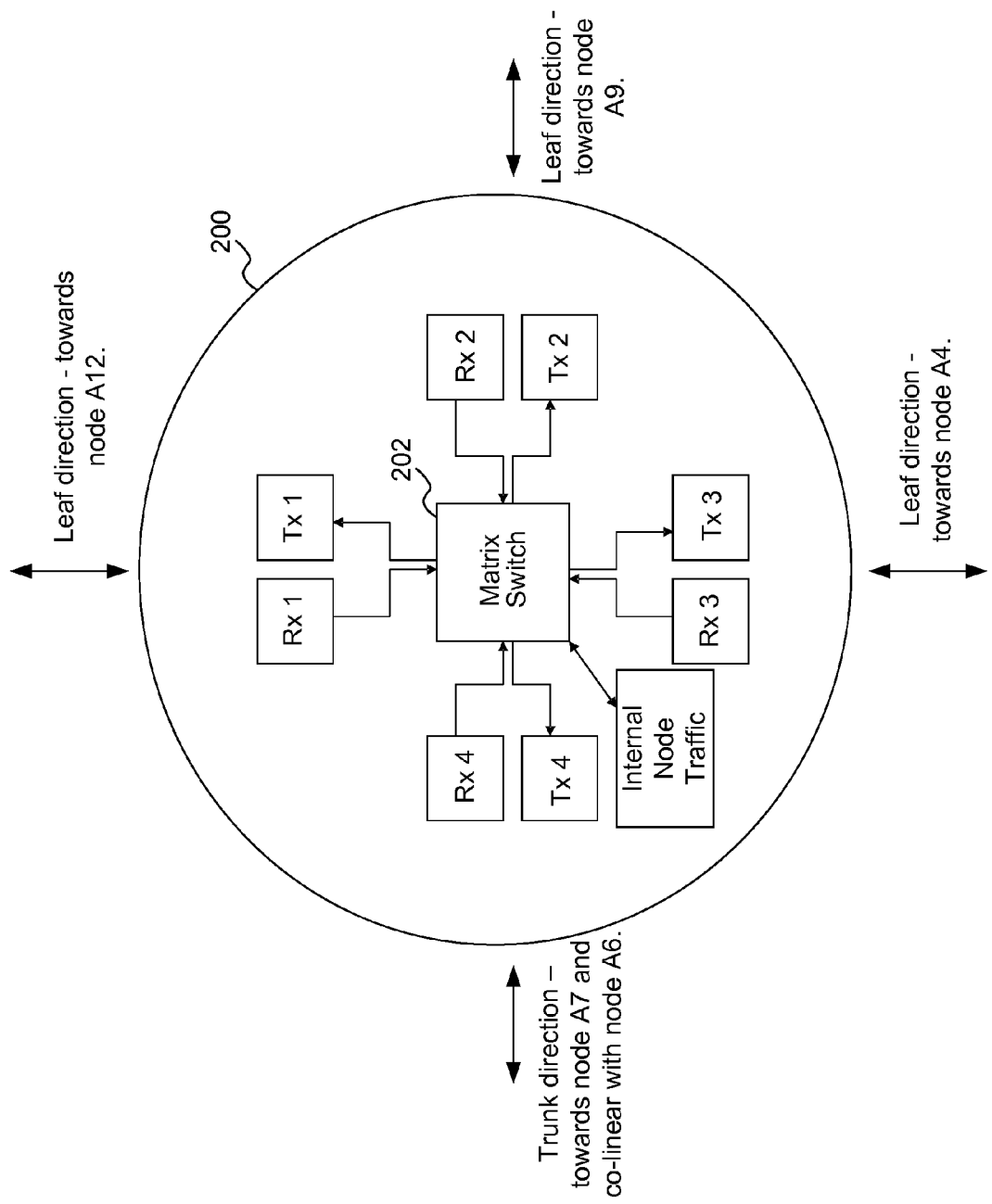
FIG. 4 illustrates a block diagram of a node of the present invention having multiple transmitters and receivers.

FIG. 4 illustrates a block diagram of a node of the present invention having multiple transmitters and receivers. Node 200 of the present invention comprises transmitters Tx1-Tx4, receivers Rx1-Rx4, and a matrix switch 202. The matrix switch 202 directs the data flow for the transmitters Tx1-Tx4, the receivers Rx1-Rx4, and any internal node traffic. The internal node traffic can comprise telemetry information (including diagnostic data of the respective node and the network) and external backhauling traffic from a Wi-Fi mesh access point ("AP") or from a gigabit ethernet port 1000 Base-T.

Since the mesh topology forms a tree structure without loops, the matrix switch 202 can be reconfigured to orient the transmitters Tx1-Tx4 and the receivers Rx1-Rx4 in accordance with the network topology and link directions. In certain embodiments of the invention, the matrix switch 202 can be a logic circuit that connects any of the receivers of a node to any of the transmitters of that node to retransmit a signal that was received to one or more active links with other interconnected nodes. For instance, if the receiver Rx4 receives a signal that is to be retransmitted via active links that are supported by the transmitters Tx1 and Tx2, then the matrix switch 202 will route the received signal from the receiver Rx4 to the transmitters Tx1 and Tx2 to be transmitted to other nodes via the active links. Assuming the transmitter Tx3 does not support an active link, then the transmitter Tx3 will not transmit the received signal. Furthermore, the matrix switch 202 may also correlate all inbound traffic in the co-linear direction to retransmit a correlated signal to the other nodes.

Figure 5:
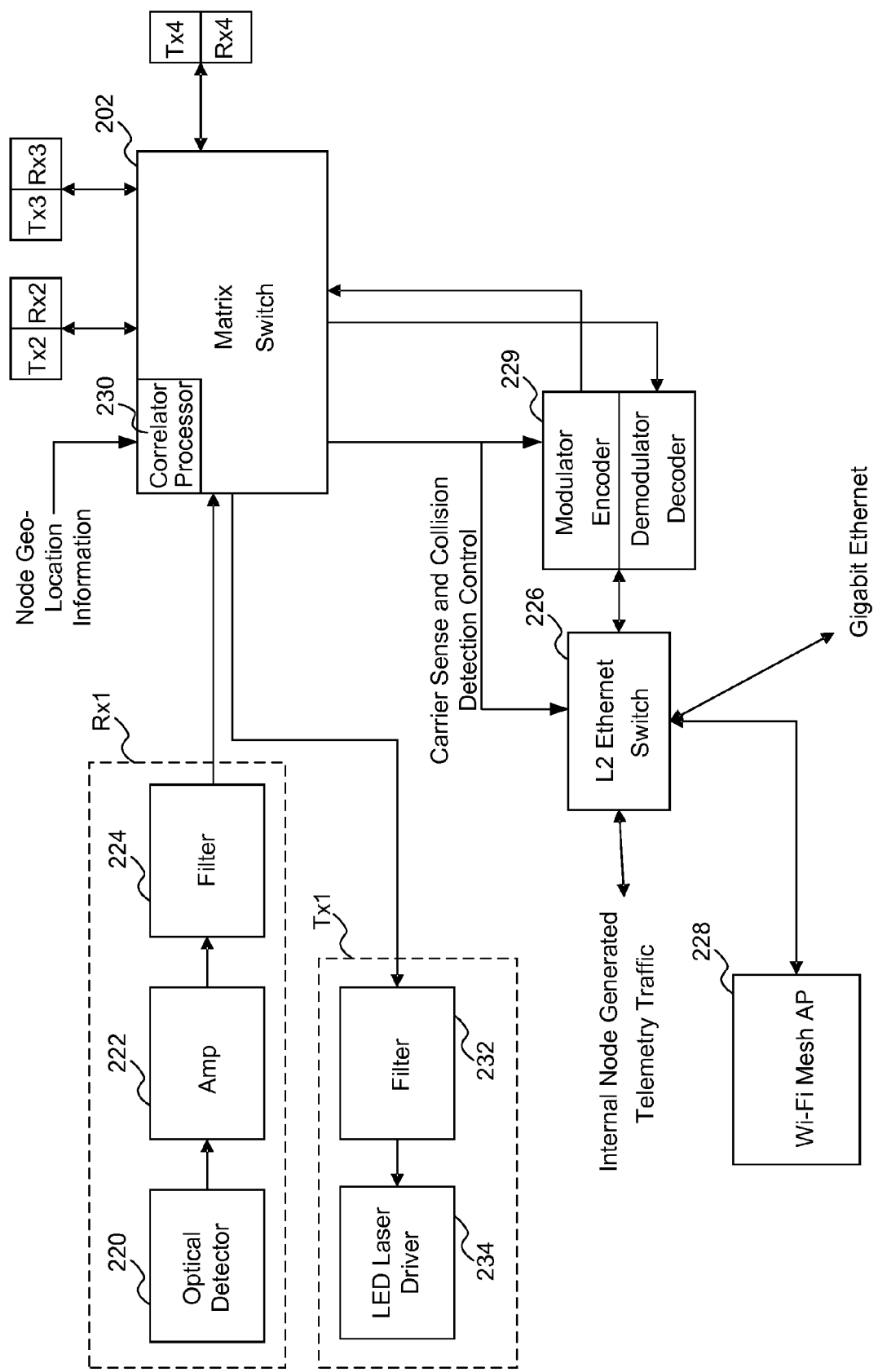
FIG. 5 illustrates a block diagram of a node of the present invention using free space optics to transmit and receive signals.

FIG. 5 illustrates a block diagram of a node of the present invention using free space optics to transmit and receive signals. A node can comprise optical transmitters Tx1-Tx4, optical receivers Rx1-Rx4, and a matrix switch 202 having a correlator processor 230. Here, the receivers Rx1-Rx4 comprise logic blocks for optical to electrical conversion and the transmitters Tx1-Tx4 comprise logic blocks for electrical to optical conversion to generate the free space optical signal.

For the receiver Rx1, an optical detector 220 is used to detect a laser signal from either an adjacent node and/or from a co-linear node beyond the adjacent node. Once the optical signal is converted to an electrical signal, the converted electrical signal is amplified 222 and then filtered 224. The filtered signal is then inputted to the matrix switch 202. The matrix switch 202 transmits the filtered signal to downstream or upstream nodes using any of its transmitters by pulse-shape filtering 232, and then converting the filtered signal to an optical signal via an LED laser diode driver 234. The transmitters Tx1-Tx4 and the receivers Rx1-Rx4 can have similar hardware implementations and operate on the same optical wavelength.

Internal node generated traffic such as telemetry data and/or ancillary traffic from video camera, audio microphones, and other devices connected to the node can be digitized and packetized according to IP protocols. Those packets can be fed to a gigabit ethernet layer 2 switch 226 via a Wi-Fi logic block 228 or any other connection means. The layer 2 switch 226 has controls from the correlator processor 230 from within the matrix switch 202 to throttle the first-in-first-out ("FIFO") within the layer 2 switch 226 so that traffic collisions can be avoided.

Packet signals coming out of the layer 2 switch 226 are sent to the modulator/encoder+demodulator/decoder 229, which conforms to standard gigabit ethernet packets. The digital signals are then modulated and encoded for transmission to any of the transmitters Tx1-Tx4 of the node. The direction of the digital signals can be determined by the configuration of the matrix switch 202. The correlator processor 230 can time align multiple received signals from either a co-linear direction or rectilinear direction to form a strengthened, correlated signal and to reduce interference by the multiple transmissions of the signal. The alignment is aided by information of the geo-location of the nodes within the cluster. The geo-location data can be used to determine co-linearity of neighboring nodes and the relative distances between nodes. This information is used to determine the phase shift and signal level of nodes to form a correlated, strengthened pulse signal and to reduce interference from the multiple transmissions. The correlator processor 230 can also determine signals that are non-correlated and thus make a decision as to whether to send the correlated signal forward or to decide that there is a collision during this pulse signal timeframe.

Figure 6:
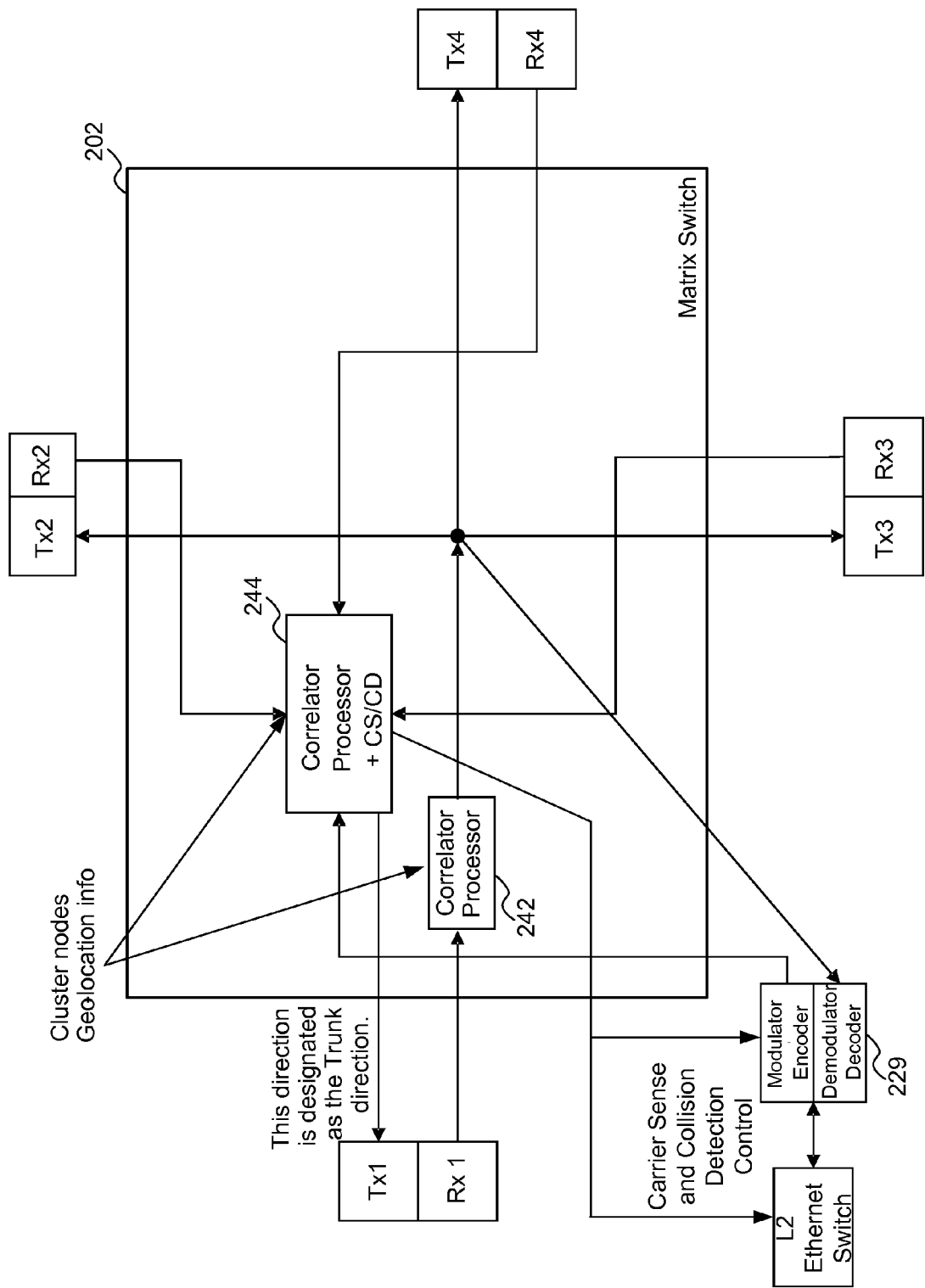
FIG. 6 illustrates a block diagram of a node of the present invention having carrier sense and collision-detection control mechanisms.

FIG. 6 illustrates a block diagram of a node of the present invention having carrier sense and collision detection control mechanisms. In this example, the transmitter Tx1 and receiver Rx1 support links to a node/internet gateway node in the trunk direction (i.e., towards an internet gateway node). The other receivers Rx2, Rx3, and Rx4 and the other transmitters Tx2, Tx3, and Tx4 support links to other nodes in the leaf direction (i.e., away from an internet gateway node). The matrix switch 202 receives input from the internal node modulator/encoder+demodulator/decoder 229. Output from receiver Rx1 is inputted to a correlator processor 242. The correlator processor 242 has access to the nodes' geo-location information. Output from the correlator processor 242 goes to the receivers and transmitters in the leaf directions and into the demodulator/decoder 229. Another correlator processor 244 that contains logic for signal/carrier sense and collision detection logic has four inputs, three from the leaf directions and one from the internal traffic. Configuration of the matrix switch 202 can be via maintenance installation or a secondary overlay network, such as Wi-Fi access. If it is determined that another receiver Rx and another transmitter Tx direction needs to be configured as the trunk direction, then the matrix switch 202 can either rotate the receivers Rx1-Rx4's and all the transmitters Tx1-Tx's port inputs or swap the signal from another receiver Rx port and another transmitter port.

Figure 7:
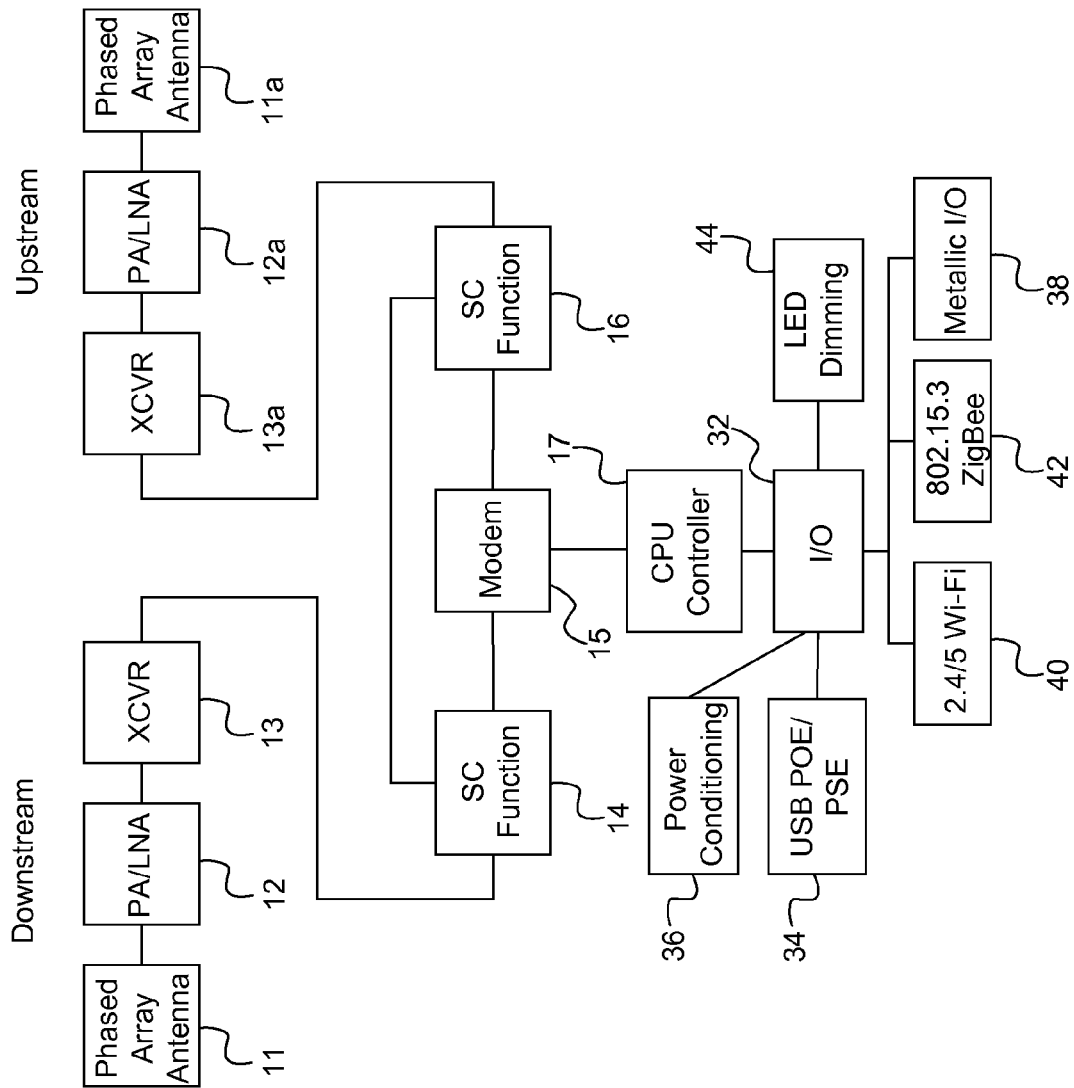
FIG. 7 illustrates a block diagram of a node of the present invention using radio frequency antennas to receive and transmit signals.

FIG. 7 illustrates a block diagram of a node of the present invention using radio frequency antennas to receive and transmit signals. A node of the present invention can comprise the following: phased array antennas 11 and 11a, RF power amplifier and low noise amplifiers 12 and 12a, transceivers 13 and 13a, a modem 15, signal correlation functions 14 and 16, a central processing unit ("CPU") controller 17, a power conditioning function 36, an input/output interface 32, a USB power over ethernet ("POE") 34, LED dimming function 44, a Wi-Fi function 40, a ZigBee function 42, and a metallic input/output interface 44.

The node can be interconnected with one or more other nodes of a mesh network via one or more active wireless links. Furthermore, the node can transmit and receive radio frequency signals in at least two directions of the mesh network. Thus, each node can comprise two or more directional electromagnetic transmitters; two or more directional electromagnetic receivers; and a matrix switch, wherein the matrix switch receives the transmission of the signal by one of the receivers and retransmits the signal by one or more of the transmitters to one or more of its interconnected nodes.

It is important to note that the number of transmitters and receivers for a node can range from one to many depending on the requirements by the respective network. For instance, a node may have only one transmitter and one receiver since it can be an end point of a cluster of nodes (i.e., that node does not have any interconnected nodes to repeat any signals to). Alternatively, the node may have two transmitters and two receivers if the node is positioned along the midpoint of a street, e.g., between two street intersections. The node can transmit a signal along a linear signal path that runs parallel to the street. Furthermore, the node can have three or more transmitters and three or more receivers if that node is positioned at an intersection, where there may be multiple linear signal paths to multiple other nodes.

The phased array antenna 11 allows for a directional RF transmission and reception of a signal on an active link to/from an adjacent node in the mesh network. Both the RF power amplifier and low noise amplifier ("PA/LNA") 12 and the transceiver ("XCVR") block 13 have channel programmability from the CPU controller 17 to use a minimum of two different channels on a given link. One channel of a link can be used for downstream side to upstream side traffic and the other channel of the link can be used for upstream side traffic to downstream side traffic. The downstream side indication for the radio logic blocks 11, 12, and 13 is to denote that this link direction is closer to the gateway node, while the upstream side indication for the radio logic blocks 11a, 12a, and 13a is in the link direction away from the gateway node.

The repeating of a symbol-time signal starts when the phased array antenna 11 receives the symbol-time signal, and then passes that signal to the RF power amplifier and low noise amplifier 12, and then further passes that amplified signal to the transceiver 13. The signal from the XCVR 13 is sent to a signal correlation ("SC") function 14 to perform signal correlation using an analog signal time domain processing algorithm. The SC functions 14 and 16 use signal processing algorithms and logic circuits, of which one form is implemented by a finite impulse response ("FIR") filter with tap coefficients that are controlled by the CPU controller 17. The tap coefficients can be determined by the relationship to the distances between the nodes of the mesh network. The distances can be determined since each node can have global positioning system ("GPS") locations for itself and adjacent nodes to calculate the respective distances between nodes. Alternatively, the node may be given the relative distances of nodes of the mesh network, rather than receiving the GPS locations. The correlated signal is then connected to a companion SC function block 16 to be passed to the upstream direction through radio logic blocks 11a, 12a, and 13a with amplification of the attenuated signal and phasing interference removed and correlated.

As the signal is repeated on the upstream side, the modem 15 performs the digital modulation and de-modulation to obtain IP packets from the symbol-time signal having one or more bits per symbol, which is then processed for information protocols of the TCP/IP stack. Typical digital modulations for the modem 15 can be of the type SC-QPSK, SC-QAM, or multi-carrier modulation such as OFDM. Note that for three or more transmitters and three or more receivers, there can still only be one modem block 15, while the blocks 11, 12, 13, and 14 are duplicated for each receiver and transmitter.

The demodulated data can be routed to various devices that are connected to the input/output interface 32 of the node, including any USB connected devices, power conditioning function 36, mechanical devices connected via the metallic input/output interface 38, devices connected via Wi-Fi 40 or ZigBee 42, LED dimming functions 44, or other devices or functions.

In alternative embodiments, the blocks 11, 12, and 13 can be replaced with lasers, photo diodes, and amplifiers when the system is configured for free space optical wireless operation. In free space optical operation, the downstream side and upstream side channels can be assigned different optical wavelengths of emission. This coordinated control of channels with adjacent nodes is the essence of the mesh network for allowing path redundancy and prevention of repeating signals in endless loops in the network topology.

Figure 8:
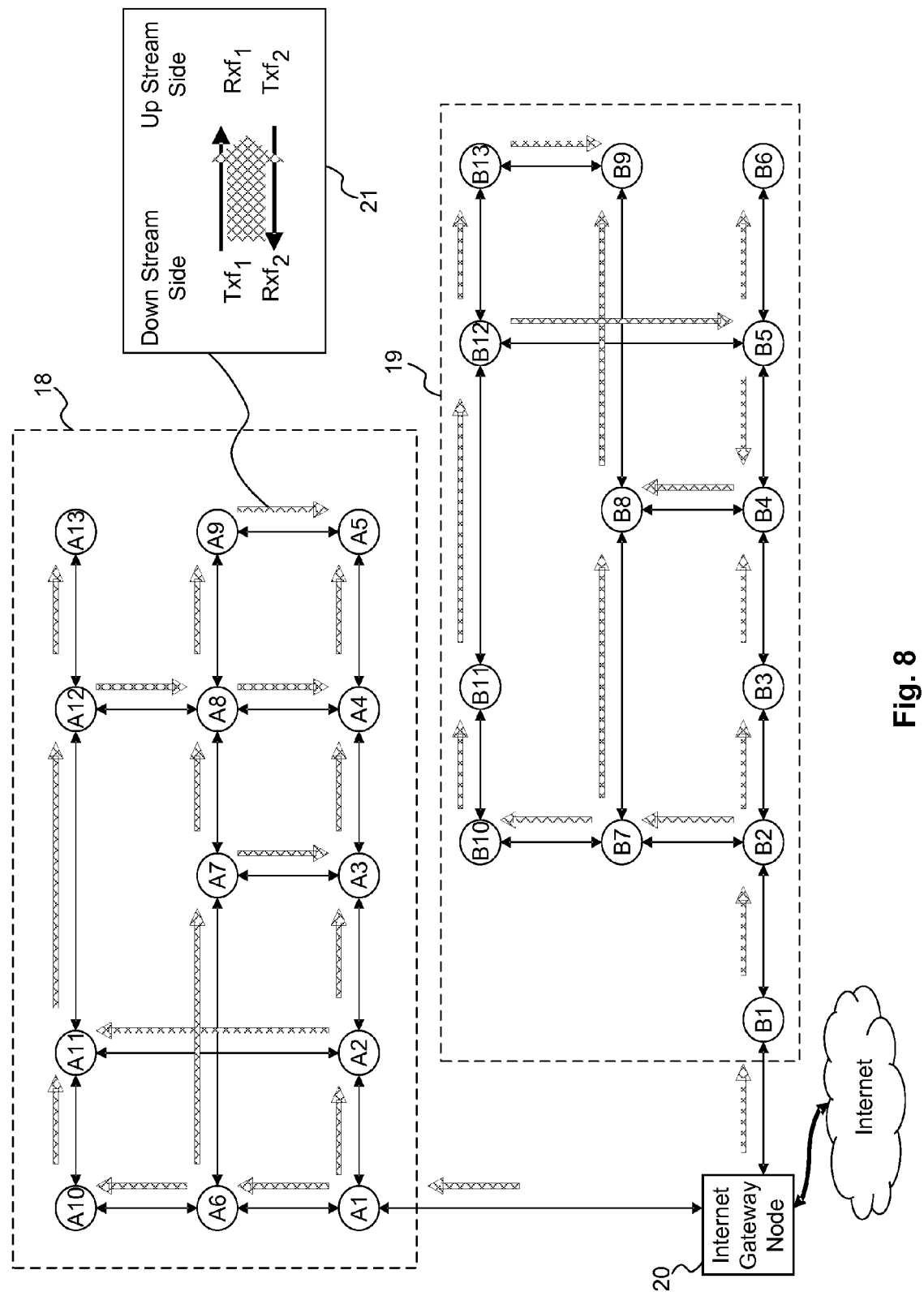
FIG. 8 illustrates a mesh network topology of the present invention comprising clusters of nodes.

FIG. 8 illustrates a mesh network topology of the present invention comprising clusters of nodes. The mesh network topology can comprise clusters 18 and 19 and internet gateway node 20. Cluster 18 comprises nodes A1-A13 and cluster 19 comprises B1-B13. Each node in clusters 18 and 19 can be coupled to different street luminaires, such that the geographic locations of the nodes coincide with the various street luminaires.

Clusters 18 and 19 are further connected to internet gateway node 20. Clusters 18 and 19 may not have connectivity between each other, other than through internet gateway node 20. All nodes within clusters 18 and 19 have two-way communication links to their associated adjacent nodes and have either co-linear alignments or rectilinear alignments.

For instance, nodes A1, A2, A3 and A4 are co-linear to A5 since these nodes share a common linear signal path. Thus, node A5 may receive co-linear transmitted signals from nodes A1, A2, A3 and A4. A receiver of A5 can then correlate these received co-linear signals via a SC function block 14. In addition, node A5 can also receive a signal from node A9, which can be correlated with the signals received from nodes A1, A2, A3, and A4 since the nodes A1-A13 in the cluster 18 are repeating the same signal. This can help in reinforcing the signal to account for localized fade around node A5. Note that node A9 is rectilinear to nodes A1-A5 since the location of node A9 is not along the linear signal path of nodes A1-A5. Therefore, the signal path between node A9 and node A5 is not parallel to the linear signal path between nodes A1-A5.

Frequency division multiplexing schemes, time division multiplexing schemes, and other multiplexing schemes can be used for transmitting data signals via the active links that interconnect the nodes of the mesh network. For instance, a channel switching method having two channels can be used to transmit and receive data signals between interconnected nodes. The channels can be assigned to each pair of interconnected nodes by having one node transmit signals on a first channel to a second node and the second node transmitting to the first node on the second channel. Consequently, the first node receives data signals on the second channel and the second node receives data signals on the first channel. Between any two interconnected nodes, the node closest to the gateway node is the node that transmits on the first channel to the other node, while the other node transmits on the second channel. In addition, the transmission on the first channel can be referred to as transmitting the signal from the downstream side to the upstream side. The transmission on the second channel can be referred to as transmitting the signal from the upstream side to the downstream side. This convention can be used throughout the mesh network to support repeating of signals from the internet gateway node to all the nodes of the mesh network and of signals from any node to the internet gateway node.

It is understood that other conventions for bi-directional communications between interconnected nodes can be used in conjunction with the present invention. Additionally, it is understood that other multiplexing schemes can be used in conjunction with the present invention for implementing various communication schemes between interconnected nodes of the network. To aide in the understanding of the invention, a channel switching method of the present invention is used below to implement communications between interconnected nodes of the mesh network. However, it would be appreciated by person having ordinary skill in the art that other multiplexing schemes can be used as well in conjunction with the present invention.

The arrows having crosshatches in clusters 18 and 19 are examples of channel alignments for each pair of interconnected nodes of the mesh network. The arrows having crosshatches point from the downstream side to the upstream side, and can be flipped around depending on the requirements of the mesh network such that the channel assignment for a pair of interconnected nodes can be switched. This directional alignment of the arrow is formed by configuration of the channel pairs, as shown in 21, where downstream side transmits at channel 1 and receives at channel 2, while the upstream side uses the reverse channel assignment. (For free space optical operation, the laser wavelength assignment can be assigned to a node according to the directional alignment of the arrow.)

This mesh networking based on physical ("PHY") radio link frequency channels is different from other mesh networking schemes where the meshing algorithm are packet based and does not touch the PHY layers, such as the typical Wi-Fi mesh networks. Here, the nodes A1-A13 and B1-B13 do not store and forward packets as in other mesh networking schemes. Rather, the mesh network of the present invention repeats the analog signal in the PHY layer. Thus, the signal can be a physical layer signal.

Also, a mesh network of the present invention can work in conjunction with co-linear and rectilinear nodes for reinforcement of a symbol-time signal having one or more bits per symbol. Thereby, the mesh network has very low latency over a large number of mesh nodes that are thousands of nodes in size. Nodes that have only directional alignment arrows pointed inward are end branch nodes; whereas internet gateway node 20 has only directional alignment arrows pointed outward from internet gateway node 20.

If another internet gateway node becomes available through a connection to the internet, then clusters 18 and/or 19 can split into further separate clusters. For instance, if cluster 18 splits into separate clusters due to an additional available internet gateway node, then nodes A1-A9 can be its own cluster connected to internet gateway node 20 and nodes A10-A13 can be its own cluster connected to the additional available internet gateway node. The two new clusters have no connectivity between them or to any other cluster, except via one of the gateway nodes.

Generally, directional alignment arrows within a cluster must not form loops since this will cause the repeating signal to race around in an infinite loop, absent other safeguards. The nodes of each cluster must communicate with each other to disconnect any loops via changing the directional alignment arrow of the link, e.g., by changing the channel frequency assignment, where the channel frequency assignment is shown in 21. The ability of a mesh network topology to form many different other types of topology such as ring or star types is an inherent advantage. There is also the ability to have path redundancy upon link failures to re-route a signal by reforming the mesh into a different configuration.

Figure 9:
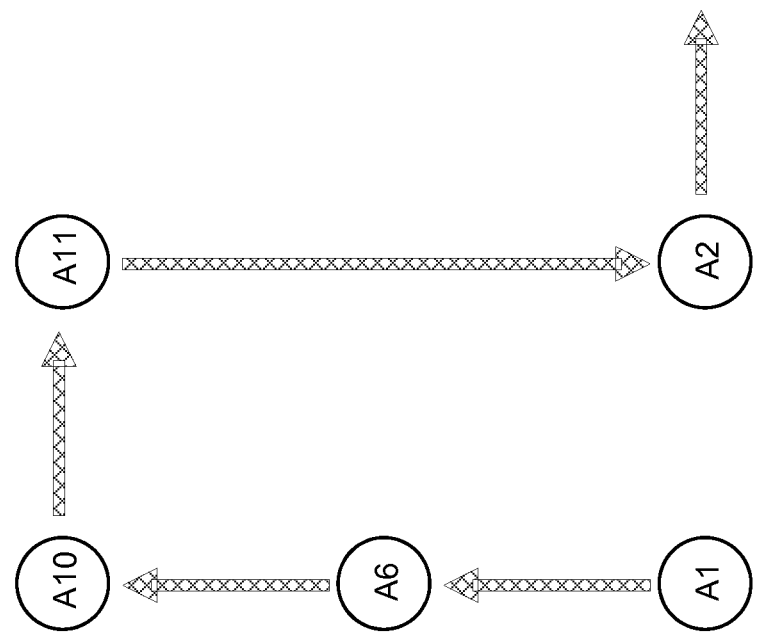
FIG. 9 illustrates a mesh network topology where a link between two nodes fails and is reconfigured.
Figure 9:
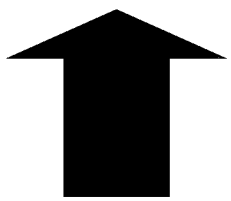
Figure 9:
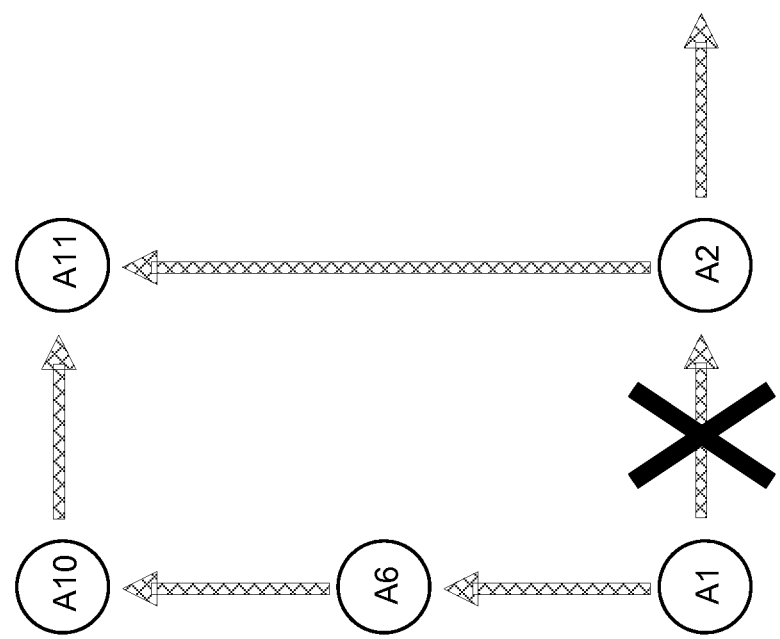

FIG. 9 illustrates a mesh network topology where a link between two nodes fails and is reconfigured. In this example, a link between node A1 and A2 has failed. Thus, node A2 has lost connectivity with the other nodes in cluster 18 since a signal traveling in cluster 18 cannot be transmitted to node A2 using the preexisting active links of cluster 18. A2 can regain connectivity by changing the downstream directional alignment arrow between node A2 and an adjacent node (e.g., node A11) such that node A2 can receive downstream/upstream traffic from that adjacent node.

Traffic flowing from the downstream side to the upstream side (i.e., in the direction of the arrow) is broadcasted by the nodes and originates from internet gateway node 20. In this case, there are no traffic collisions. Traffic flowing from the upstream side to the downstream side (i.e., against the arrow direction) is traffic generated by the nodes to internet gateway node 20. Here, there is the possibility of collision between the traffic of other nodes that are sending traffic at the same time since a single node might receive transmissions of different signals.

Figure 10:
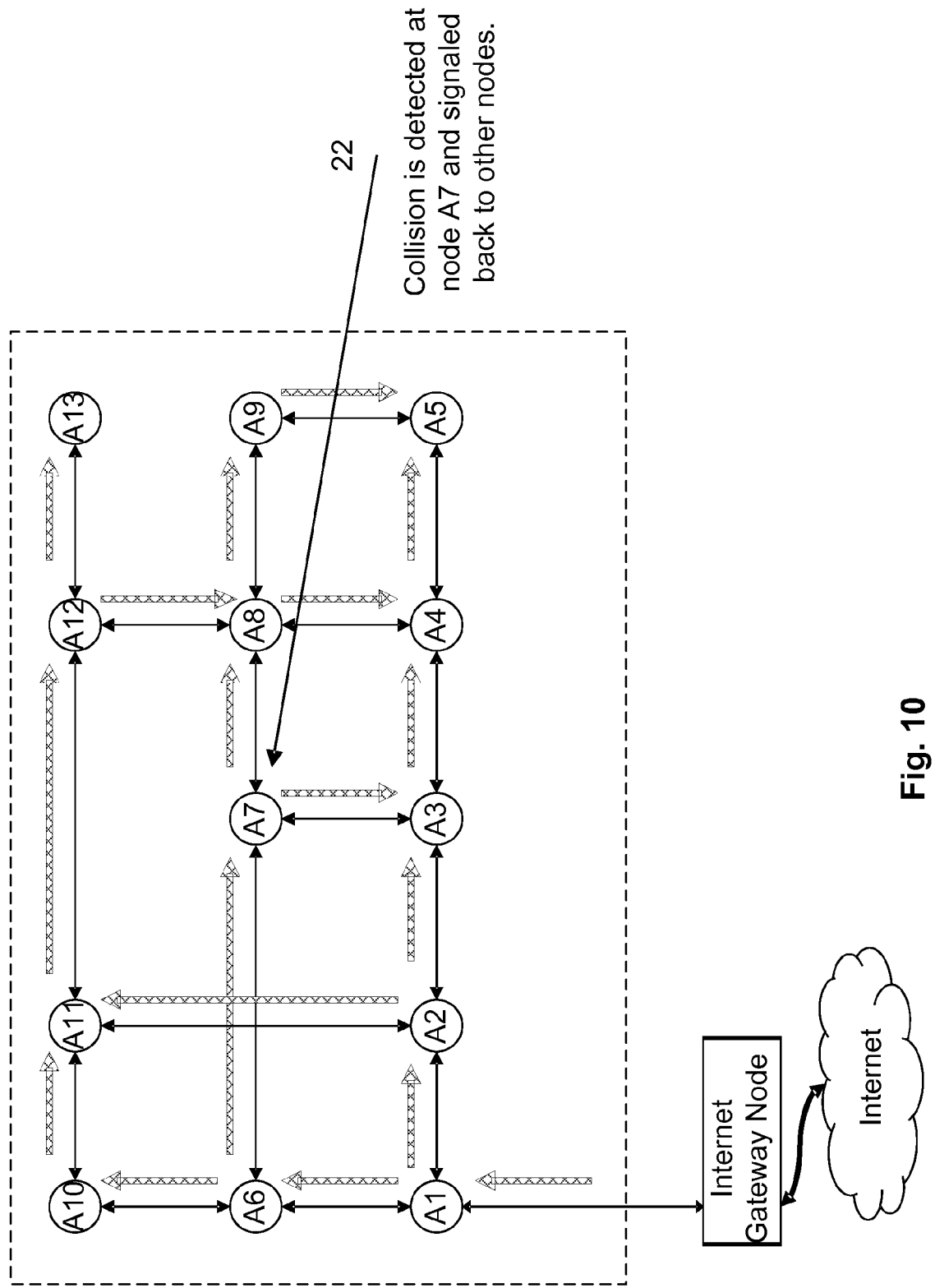
FIG. 10 illustrates a network topology of the present invention where node traffic directed to an internet gateway node collides with other node traffic.

FIG. 10 illustrates a network topology of the present invention where upstream traffic collides. A collision can be detected by node A7 when node A9 and node A3 send traffic from the upstream side to the downstream side that collides at node A7 (see arrow 22). Once the collision is detected, then node A7 sends a signal (e.g., a pilot carrier signal) along the same direction as the directional alignment arrow to the nodes. Upon detection of this pilot carrier signal as received by nodes A8, A9, A3, A4 and A5, then these nodes will determine if they were in the process of sending traffic from the upstream side to the downstream side that causes the collision at node 7. If they were, then those nodes will use a back-off algorithm to resend their respective transmissions. Back-off algorithms for ethernet collision detection and re-transmissions of packets can be used or other network collision algorithms can be used here as well.

Figure 11:
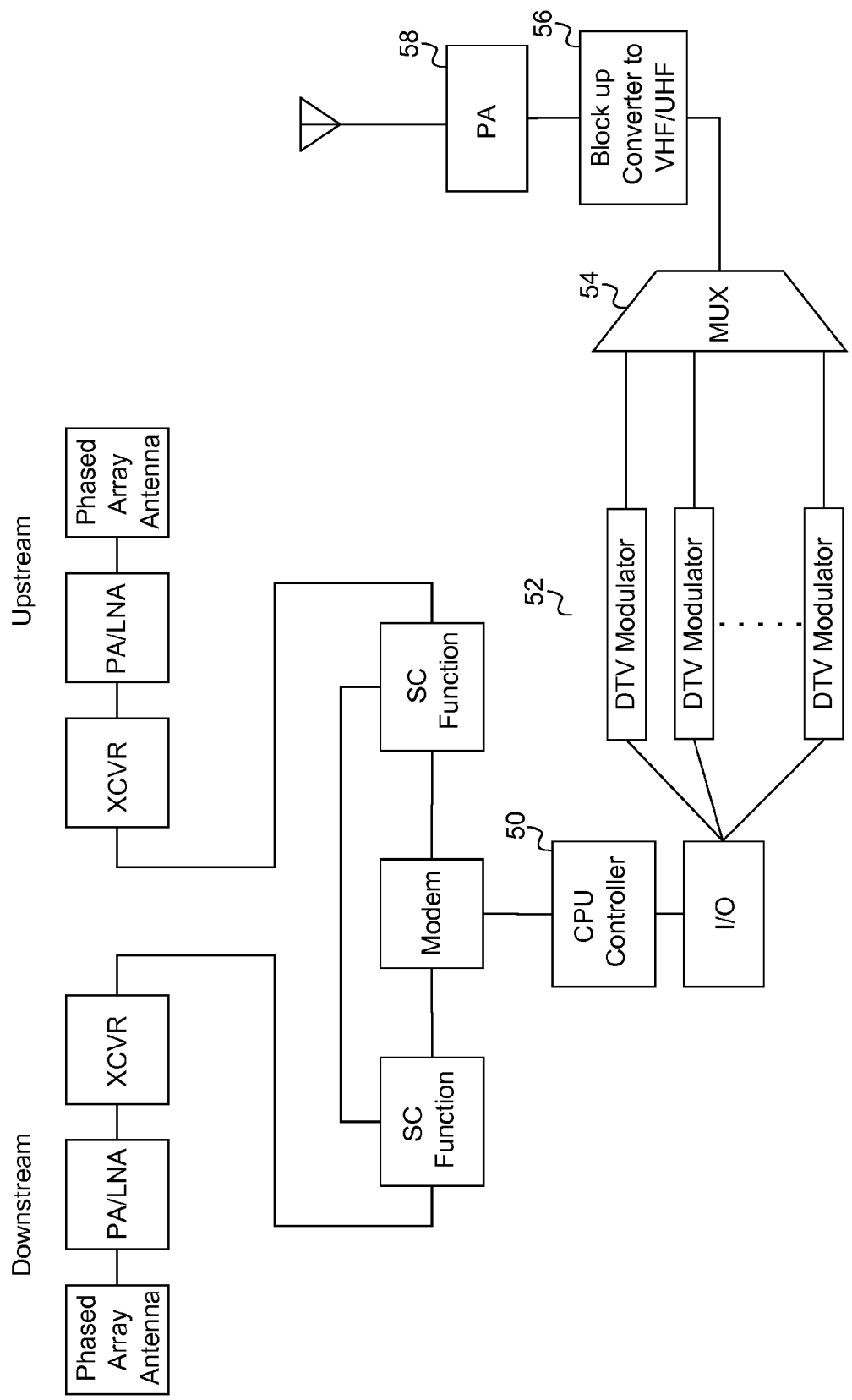
FIG. 11 illustrates a block diagram of a node of the present invention for providing digital television broadcasts.

FIG. 11 illustrates a block diagram of a node of the present invention for providing digital television. For digital television ("DTV") broadcasts, there are times when only a single transmission tower is used. This results in low to no coverage of areas that are shadowed by buildings and other obstructions that obstruct the line of sight of the television signal between the transmission tower and a receiver (e.g., a home antenna).

Thus, a node of the present invention can transmit DTV signals from a luminaire allowing for superior line of sight coverage to many of the shadowed areas. Also, the nature of the signal repeating with no collision and reinforcement of the signal is an ideal method to gain retransmission and redistribution of the commercial television broadcast signal.

The broadcast content of the television is typically in a digital compressed format of either MPEG-2 or MPEG-4. The mesh network can distribute that data over the IP network using a multi-cast packet format. The capacity to transport fifty or more different television programs is available as this would be less than the two or more Gbps capacity of the IP traffic. Each of the television programs in either MPEG-2 or MPEG-4 format can be delivered to the CPU controller 50, and is then outputted to individual digital TV modulators 52 for digital modulation types associated with different regions of the world, i.e. ATSC, DVB-T, DVB-H, ISDB-T or DMB.

The DTV modulators 52 are then multiplexed 54 into the appropriate television channel assignments in the VHF/UHF television bands 56. The signals are then transmitted and broadcasted by a lower power amplifier 58, which is appropriate for shadow areas. The advantage of this type of DTV retransmission and redistribution is that the original content is distributed in a non-degraded digital format.

Figure 12:
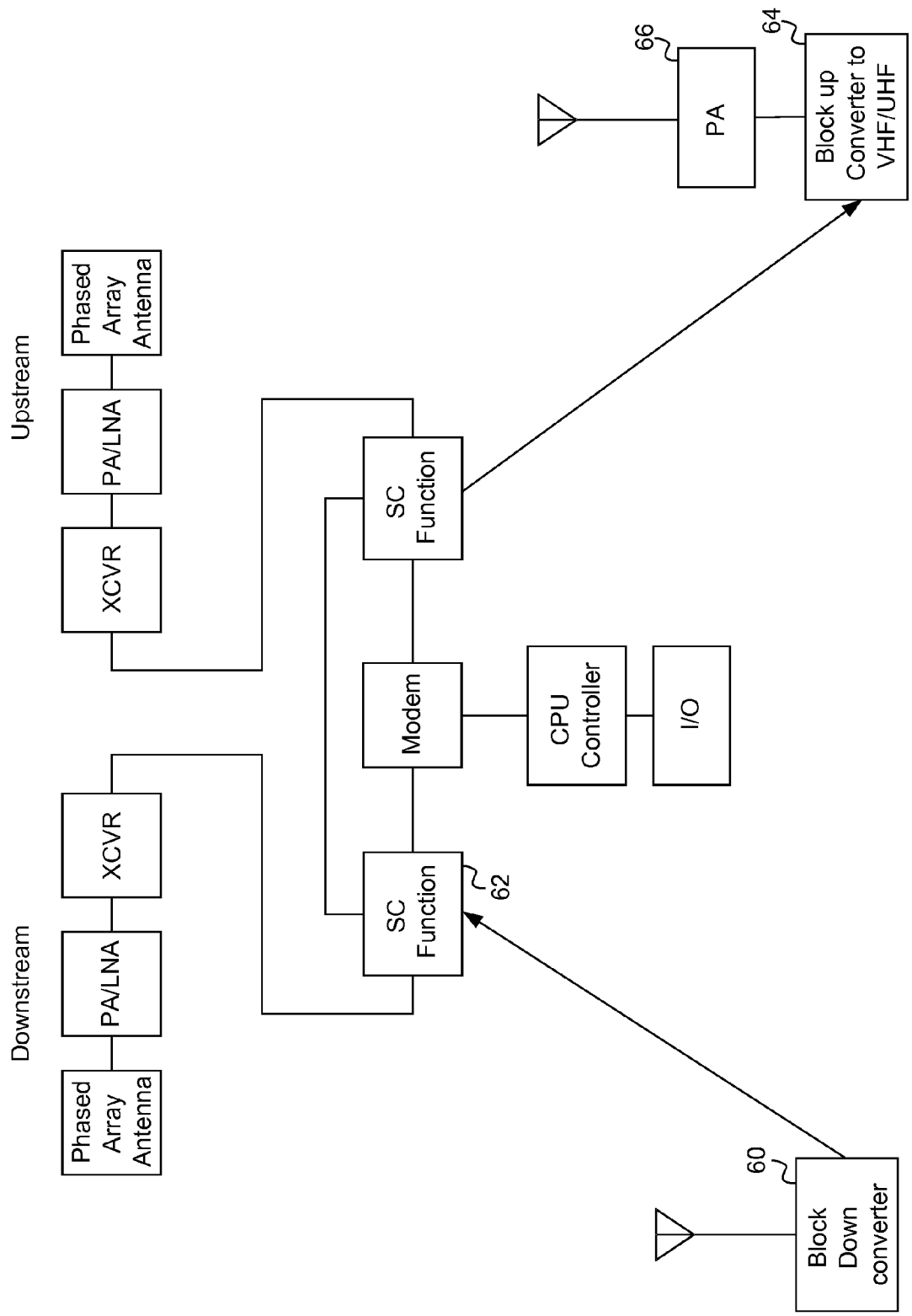
FIG. 12 illustrates a block diagram for node of the present invention for DTV retransmission and redistribution.

FIG. 12 illustrates a block diagram for node of the present invention for DTV retransmission and redistribution. Here, the original television program content in digital format of MPEG-2 or MPEG-4 is not required since the DTV analog signal can be repeated via a mesh network of the present invention. Within a cluster of nodes, if one of the nodes is within the line of sight of the television broadcast tower and this node is relatively positioned to be more closer than other nodes (where those other nodes are in the shadow area of the television broadcast tower), then a block down converter from UHF 60 can be used to bring a set of television channels to baseband and multiplexed into the analog signal repeater of SC function block 62. This baseband television signal in either ATSC, DVB, ISDB or DMB format can then be repeated via this mesh network of the present invention to nodes that are in the shadow areas. The signal can be up-converted to UHF television band 64 and retransmitted using the low power amplifier 66, which has a line of sight to the shadow areas.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A communications network, comprising:
   a plurality of nodes, wherein the nodes are interconnected via links; and
   a gateway node that transmits a signal to one or more of the nodes,
   wherein certain ones of the nodes receives a transmission of the signal and selected ones of the nodes repeats the transmission of the signal,
   wherein a given node of the interconnected nodes receives multiple transmissions of the signal from two or more other nodes of the interconnected nodes,
   wherein the multiple transmissions of the signal are time aligned by the given node,
   wherein a correlated signal is generated based on the time aligned signals using signal processing,
   wherein the correlated signal is a composite of the time aligned signals, and
   wherein only the correlated signal is retransmitted by the given node.

2. The communications network of claim 1 wherein a second node is interconnected with a third node and a fourth node of the interconnected nodes, wherein the second node, the third node, and the fourth node are along a linear signal path, wherein the fourth node receives multiple transmissions of the signal from the second node and from the third node, wherein the fourth node time aligns the multiple transmissions of the signal from the second node and from the third node, and wherein the fourth node correlates the multiple transmissions of the signal using signal processing into a single correlated signal.

3. The communications network of claim 1 wherein a second node is interconnected with a third node and a fourth node of the interconnected nodes, wherein the second node and the third node are connected on a first linear signal path and the second node and the fourth node are connected on a second linear signal path, wherein the first linear signal path and the second linear signal path are not parallel, wherein the fourth node receives multiple transmissions of the signal from the second node and from the third node, wherein the fourth node time aligns the multiple transmissions of the signal from the second node and from the third node, and wherein the fourth node correlates the multiple transmissions of the signal using signal processing into a single correlated signal.

4. The communications network of claim 1 wherein the correlated signal is transmitted to the interconnected nodes connected to the given node.

5. The communications network of claim 1 wherein correlation is performed as a function of respective distances of the interconnected nodes, signal processing delay at each of the interconnected nodes, and respective attenuation of the multiple transmissions.

6. The communication network of claim 1 wherein the interconnected nodes are fixed at designated geographical locations, and wherein distances between the given node and the other ones of the interconnected nodes are used to calculate a phase shift to time align the multiple transmissions of the signal.

7. The communications network of claim 1 wherein the interconnected nodes are at known designated geographical locations and wherein those known designated geographical locations are transmitted to the other nodes of the network.

8. The communications network of claim 1 wherein each of the interconnected nodes is coupled to a street lamp.

9. The communications network of claim 1 wherein each of the interconnected nodes comprises,
two or more directional electromagnetic transmitters;
two or more directional electromagnetic receivers; and
a matrix switch, wherein the matrix switch receives an optical signal via one of the receivers,
wherein the received optical signal is converted to a baseband electrical signal,
wherein the baseband electrical signal is converted to a retransmission optical signal, and
wherein the retransmission optical signal is retransmitted by one or more of the transmitters to one or more of its interconnected nodes.

10. The communications network of claim 1 wherein the signal is a symbol-time signal having one or more bits per symbol.

11. The communications network of claim 1 wherein the signal is a physical layer signal, wherein the signal represents a portion of a plurality of network data packets, and wherein the selected ones of the nodes retransmit the signal without first storing the network data packet.

12. A communications network, comprising:
a plurality of nodes, wherein the nodes are interconnected via links; and
a gateway node that transmits a signal to one or more of the nodes,
wherein the signal is a symbol-time signal having one or more bits per symbol,
wherein certain ones of the nodes receives a transmission of the signal and selected ones of the nodes repeats the transmission of the signal,
wherein a given node of the interconnected nodes receives multiple transmissions of the signal from two or more other nodes of the interconnected nodes,
wherein the multiple transmissions of the signal are time aligned by the given node,
wherein a correlated signal is generated based on the time aligned signals using signal processing,
wherein the correlated signal is a composite of the time aligned signals,
wherein correlation is performed as a function of respective distances of the interconnected nodes, signal processing delay at each of the interconnected nodes, and respective attenuation of the multiple transmissions,
wherein only the correlated signal is transmitted to the interconnected nodes connected to the given node,
wherein a second node is interconnected with a third node and a fourth node of the interconnected nodes, and
wherein the second node, the third node, and the fourth node are along a linear signal path.

13. The communications network of claim 12 wherein a fifth node is interconnected with a sixth node and a seventh node of the interconnected nodes, wherein the fifth node and the sixth node are connected on a first linear signal path and the fifth node and the seventh node are connected on a second linear signal path, wherein the first linear signal path and the second linear signal path are not parallel, wherein the seventh node receives multiple transmissions of the signal from the fifth node and from the sixth node, wherein the seventh node time aligns the multiple transmissions of the signal from the fifth node and from the sixth node, and wherein the seventh node correlates the multiple transmissions of the signal using signal processing into a single correlated signal.

14. The communication network of claim 12 wherein the interconnected nodes are fixed at designated geographical locations.

15. The communications network of claim 12 wherein the interconnected nodes are at known designated geographical locations, wherein those known designated geographical locations are transmitted to the other nodes of the network, and wherein distances between the given node and the other ones of the interconnected nodes are used to calculate a phase shift to time align the multiple transmissions of the signal.

16. The communications network of claim 12 wherein each of the interconnected nodes is coupled to a street lamp.

17. The communications network of claim 12 wherein each of the interconnected nodes comprises,
two or more directional electromagnetic transmitters;
two or more directional electromagnetic receivers; and
a matrix switch, wherein the matrix switch receives an optical signal via one of the receivers,
wherein the received optical signal is converted to a baseband electrical signal,
wherein the baseband electrical signal is converted to a retransmission optical signal, and
wherein the retransmission optical signal is retransmitted by one or more of the transmitters to one or more of its interconnected nodes.

18. The communications network of claim 12 wherein the signal is a physical layer signal, wherein the signal represents a portion of a plurality of network data packets, and wherein the selected ones of the nodes retransmit the signal without first storing the network data packet.

19. A communications network, comprising:
a plurality of nodes, wherein the nodes are interconnected via links, wherein the interconnected nodes are fixed at designated geographical locations, and wherein certain ones of the interconnected nodes are coupled to street lamps; and
a gateway node that transmits a signal to one or more of the nodes,
wherein the signal is a symbol-time signal having one or more bits per symbol wherein certain ones of the nodes receives a transmission of the signal and selected ones of the nodes repeats the transmission of the signal,
wherein a given node of the interconnected nodes receives multiple transmissions of the signal from two or more other nodes of the interconnected nodes,
wherein the multiple transmissions of the signal are time aligned by the given node,
wherein distances between the given node and the other ones of the interconnected nodes are used to calculate a phase shift to time align the multiple transmissions,
wherein a correlated signal is generated based on the time aligned signals using signal processing,
wherein the correlated signal is a composite of the time aligned signals,
wherein only the correlated signal is transmitted to the interconnected nodes connected to the given node,
wherein a second node is interconnected with a third node and a fourth node of the interconnected nodes,
wherein correlation is performed as a function of respective distances of the interconnected nodes, signal processing delay at each of the interconnected nodes, and respective attenuation of the multiple transmissions,
wherein the second node, the third node, and the fourth node are along a linear signal path
wherein a fifth node is interconnected with a sixth node and a seventh node of the interconnected nodes,
wherein the fifth node and the sixth node are connected on a first linear signal path,
wherein the fifth node and the seventh node are connected on a second linear signal path,
wherein the first linear signal path and the second linear signal path are not parallel, and
wherein each of the interconnected nodes comprises,
   two or more directional electromagnetic transmitters;
   two or more directional electromagnetic receivers; and
   a matrix switch, wherein the matrix switch receives an optical signal via one of the receivers,
wherein the received optical signal is converted to a baseband electrical signal,
wherein the baseband electrical signal is converted to a retransmission optical signal,
wherein the retransmission optical signal is retransmitted by one or more of the transmitters to one or more of its interconnected nodes,
wherein the signal represents a portion of a plurality of network data packets, and
wherein the selected ones of the nodes retransmit the signal without first storing the network data packet.

* * * * *